US012711602B2

(12) United States Patent
Keith, Jr. et al.

(10) Patent No.: US 12,711,602 B2
(45) Date of Patent: Aug. 18, 2026

(54) ITEM IDENTITY VIA SCANNING TECHNOLOGIES

(71) Applicants: Robert O. Keith, Jr., San Jose, CA (US); Sudha Manjunath, Fremont, CA (US)

(72) Inventors: Robert O. Keith, Jr., San Jose, CA (US); Sudha Manjunath, Fremont, CA (US)

(*) Notice: Subject to any disclaimer, the term of this patent is extended or adjusted under 35 U.S.C. 154(b) by 0 days.

(21) Appl. No.: 18/920,915

(22) Filed: Oct. 20, 2024

(65) Prior Publication Data

US 2026/0112020 A1 Apr. 23, 2026

(51) Int. Cl.

*G06T 7/00* (2017.01)
*G06V 10/764* (2022.01)
*G06V 30/14* (2022.01)

(52) U.S. Cl.

CPC .......... *G06T 7/0008* (2013.01); *G06V 10/764* (2022.01); *G06V 30/14* (2022.01); *G06T 2207/20081* (2013.01); *G06T 2207/30124* (2013.01)

(58) Field of Classification Search

CPC .... B07C 3/14; B07C 3/00; B07C 3/18; B07C 1/00; B07C 2301/0058; B07C 3/20; B07C 7/005; G06F 16/583; G06F 16/532; G06F 16/50; G06F 21/60; G06F 18/214; G06F 21/6209; G06F 2119/18; G06F 3/04842; G06F 3/04845; G06F 3/1205; G06F 3/1242; G06F 3/126; G06F 3/1288; G06F 30/00;

(Continued)

(56) References Cited

U.S. PATENT DOCUMENTS 5,873,068 A 2/1999 Beaumont
6,366,696 B1 * 4/2002 Hertz .................. G06V 30/146 382/181
7,903,838 B2 3/2011 Hudnut (Continued)

FOREIGN PATENT DOCUMENTS

CN 108536780 B 4/2020
CN 114690670 A 7/2022
CN 116664395 A 8/2023

OTHER PUBLICATIONS

Yale Cleaners, "Extra Care How Does it Work?", Sep. 2018, https://www.facebook.com/YaleCleaners/videos/extra-care-how-does-it-work/696876350710820/(Year: 2018).

(Continued)

*Primary Examiner* — Alex Kok S Liew
(74) *Attorney, Agent, or Firm* — Haverstock & Owens, A Law Corporation

(57) ABSTRACT

A service portal enables a user to request a service from a variety of service providers from the comfort of home or elsewhere. The user is able to place the order and pay for the service using a computing device. Depending on the service request, additional steps may be included such as scanning an item or a room, packaging an item, and/or other preparatory steps. Items are able to be identified via scanning. Order entry is able to be initiated via the scanned identification. The scanned items are able to be inventoried and managed. Augmented reality is able to be used with the scanned items. A standalone services app is able to provide entertainment and other accompanying services.

31 Claims, 7 Drawing Sheets

(58) Field of Classification Search
CPC ...... G06F 40/12; G06F 1/1626; G06F 1/1686; G06F 1/1694
See application file for complete search history.

(56) References Cited

U.S. PATENT DOCUMENTS 8,406,566 B1 3/2013 Wilensky
9,117,137 B2 8/2015 Uchiyama
9,691,161 B1 * 6/2017 Yalniz .................... G06T 7/11
9,828,094 B2 11/2017 McMillion
10,521,865 B1 12/2019 Spader
10,614,506 B2 4/2020 Penner
10,685,400 B1 6/2020 Brandmaier
10,706,524 B2 7/2020 Kichar
10,713,775 B2 7/2020 Bae
10,789,702 B2 9/2020 Dahlmeyer, Jr.
10,825,567 B1 11/2020 Wala
10,846,678 B2 11/2020 Patil
10,989,592 B2 4/2021 Neumaier
11,023,938 B2 6/2021 Chalkley
11,157,988 B2 10/2021 Penner
11,263,579 B1 3/2022 Siegel
11,314,401 B2 4/2022 Lee
11,327,503 B2 5/2022 Deyle
11,328,339 B2 5/2022 Penner
11,430,043 B2 8/2022 Penner
11,526,925 B2 12/2022 Penner
11,544,768 B2 1/2023 Penner
11,645,837 B1 5/2023 Ko
11,782,452 B2 10/2023 Deyle
11,861,953 B1 1/2024 Hayes
11,875,389 B2 1/2024 Chalkley
12,033,477 B2 7/2024 Dion
2001/0042391 A1 11/2001 Wobkemeier
2001/0049846 A1 12/2001 Guzzi
2004/0119972 A1 6/2004 Smit-Kingma
2004/0133516 A1 * 7/2004 Buchanan ............ G06Q 20/204 705/42
2004/0245334 A1 * 12/2004 Sikorski ................ G06F 3/147 235/383
2005/0135703 A1 * 6/2005 Wang ....................... G06T 5/20 382/275
2012/0139540 A1 6/2012 Flood
2013/0086520 A1 4/2013 Beaudet
2015/0058150 A1 2/2015 Gura
2017/0149708 A1 5/2017 Baumgartner
2018/0197221 A1 7/2018 Grossman
2018/0218433 A1 8/2018 Penner
2018/0253430 A1 9/2018 Grigorescu
2019/0164205 A1 5/2019 Agrawal
2019/0239716 A1 * 8/2019 Choi .................. A47L 15/4295
2019/0392568 A1 12/2019 Dahlmeyer, Jr.
2020/0089997 A1 * 3/2020 Chaubard ............. G06V 10/34
2020/0134806 A1 4/2020 Kessler
2020/0174494 A1 6/2020 Lessels
2020/0184591 A1 6/2020 Balu
2020/0311798 A1 10/2020 Forsyth
2020/0320610 A1 10/2020 Penner
2021/0014201 A1 1/2021 Crabtree
2021/0026521 A1 1/2021 Lee
2021/0048829 A1 2/2021 Deyle
2021/0090143 A1 3/2021 Chalkley
2021/0108351 A1 4/2021 Patterson
2021/0233152 A1 7/2021 Penner
2021/0256588 A1 8/2021 Moosaei
2021/0272171 A1 9/2021 Chalkley
2021/0334590 A1 * 10/2021 Rodriguez ........... G06F 18/214
2021/0350422 A1 11/2021 Amron
2021/0350442 A1 11/2021 Amron
2022/0101408 A1 3/2022 Penner
2022/0138683 A1 5/2022 Nimry
2022/0188898 A1 6/2022 Penner
2022/0262189 A1 8/2022 Dion
2022/0283590 A1 9/2022 Deyle
2022/0327321 A1 10/2022 Vemulapalli
2022/0327608 A1 10/2022 Assouline
2022/0343393 A1 10/2022 Penner
2022/0358673 A1 11/2022 Patel
2022/0366476 A1 11/2022 Penner
2023/0069541 A1 3/2023 Arharya
2023/0104294 A1 4/2023 Minvielle
2023/0120374 A1 4/2023 Reczek
2023/0126384 A1 4/2023 Adamy
2023/0140225 A1 5/2023 Ko
2023/0196424 A1 6/2023 Mahoney
2023/0297933 A1 9/2023 Purohit
2024/0005265 A1 1/2024 Gupta
2024/0005388 A1 1/2024 Gore
2024/0013277 A1 1/2024 Pehrson
2024/0070737 A1 2/2024 Chalkley
2024/0070899 A1 2/2024 Wagner
2024/0265436 A1 8/2024 Kairali
2024/0312284 A1 9/2024 Dion
2024/0370130 A1 11/2024 Baer
2025/0051996 A1 2/2025 Alban

OTHER PUBLICATIONS

Yale Cleaners, "Introducing the new Yale Cleaners App!", snapshot taken Mar. 4, 24, https://web.archive.org/web/20240304151752/https;//yalecleaners.com/App, hereinafter Yale2 (Year:2024).
Koike, "Discrimination of clothing materials from smartphone camera images", 2023,https://web.p.ebscohost.com/ehost/pdfviewer?vid=0&SID=5dae94dd-265d-43e1-b62e64000f88ac11bf%40redis (Year: 2023).
Xavier Biseul, The Benefits of Virtual and Augmented Reality for Maintenance, Praxedo, Sep. 4, 2018 (Year: 2018).
Gomez, Rodrigo Rico et al., An AI pipeline for garment price projection using computer vision Natural Computing and Applications, May 2024 (Year: 2024).
Wjingaarden, Melissa, How to Digitise Your Wardrobe & Make the Most of It (Best Apps) ProjectCece.com, Sep. 6, 2023 (Year: 2023).
Goode, Lauren, Turn Old Clothes Into Cash With These Apps, VOX, Jan. 19, 2015 (Year: 2015) VOX, Jan. 19, 2015 (Year:2015).
Wrightman-Stone, Danielle, Whering app expands into care, repair and donation Fashion United, Aug. 12, 2021 (Year: 2021).
Hanchinal, Tainiyat K. et al., Clothese Price Comparison Using Machine Learning International Journal of Engineering and Technology, vol. 11, No. 3, Mar. 2024 (Year: 2024).
Liu, Ziwel et al., DeepFashion; Powering Robust Clothes Recognition and Retrieval with Rich Annotations IEEE<Explore, 2016 IEEE Conference on Computer Vision and Pattern Recognition (CVPR), 2016 (Year: 2016).
Zou , Xingxing et al., FashionAI; Hierarchial Dataset for Fashion Understanding 2019 IEEE/CVF Conference on Computer Vision and Pattern Recognition Workshops, 2019 (Year: 2019).
"The DIY Thinkers Harnessing the Power of Artificial Intelligence", 2018, https://www.wired.com/story/diy-tinkerers-artificial-intelligence-smart-tech/ (Year:2018).
Nalwan, "Teaching AI to Identifify Clothes", 2020, https://agustinus-nalwan.medium.com/teaching-ai-to-identify-clothes-1feb0a8b3446 (Year:2020).
Paraska, "Vision Methods of Examining the Cleanliness of Textile Materials", 2012 (Year: 2023).
Chandran, Lithin et al., Identification of Stain on White Fabric and Data Set Generation 2019 2nd International Conference on Intelligent Computing, Instrumentation and Control Technologies (ICICIC), 2019 (Year: 2019).
Islam, Farzana et al., FabricSpotDefect: An annotated dataset for identifying spot defects in different fabric types Data in Brief, vol. 57, 2024 (Year: 2024).
Silva, Luis et al., Automatic system to identify and manage garments for blind people ACTA IMEKO, ISSN:2221-870X, vol. 12, No. 3, 1-10, Sep. 2023 (Year: 2023).
Rocha, Daniel et al., Design of a Smart Mechatronic System to Combine Garments for Blind People: First Insights HealthyIoT 2019, LNICST 314, 20202 (Year: 2020).

(56) References Cited

OTHER PUBLICATIONS

Rocha, Daniel et al., Using Object Detection Technology to Identify Defects in Clothing for Blind People Sensors, vol. 23, Apr. 2023 (Year: 2023).
Bosch X-Spect Laundry Scanner iF Gold, 2019 (Year 2019).
Bosch Reveals ZX-Spect Scanner, Allowing You to Look Into Your Food and Fabric iReviews.com, Sep. 5, 2017 (Year: 2017).
Wikipedia, "Mask (computing)", www.wiipedia.org., version of article dated Oct. 10, 2024, article retrieved on Sep. 9, 29, 2025.
Simonlite "The DIY Tinkerers Harnessing the Power of Artificial Intelligence", 2018 (Year 2018).
Menafn, "Global Drone Service Market Size to Reachd 641.05 Billion In 2032 Emergen Research,", MENAFN—Press Releases (English), Sep. 20, 2023.

* cited by examiner

ITEM IDENTITY VIA SCANNING TECHNOLOGIES

FIELD OF THE INVENTION

The present invention relates to services. More specifically, the present invention relates to a portal to request and receive services.

BACKGROUND OF THE INVENTION

Companies such as Doordash® and Uber Eats® enable a user to purchase items such as food from a food provider. The food is then delivered to the user. The user is able to place the order and pay for the order using a computing device, thus enabling the user to receive a meal without leaving home.

SUMMARY OF THE INVENTION

A service portal enables a user to request a service from a variety of service providers from the comfort of home or elsewhere. The user is able to place the order and pay for the service using a computing device. Depending on the service request, additional steps may be included such as scanning an item or a room, packaging an item, and/or other preparatory steps. Items are able to be identified via scanning. Order entry is able to be initiated via the scanned identification. The scanned items are able to be inventoried and managed. Augmented reality is able to be used with the scanned items. A standalone services app is able to provide entertainment and other accompanying services.

DETAILED DESCRIPTION OF THE PREFERRED EMBODIMENT

A service portal enables a user to request a service from a variety of service providers from the comfort of home or elsewhere. The user is able to place the order and pay for the service using a computing device. Depending on the service request, additional steps may be included such as scanning an item or a room, packaging an item, and/or other preparatory steps.

Figure 1:
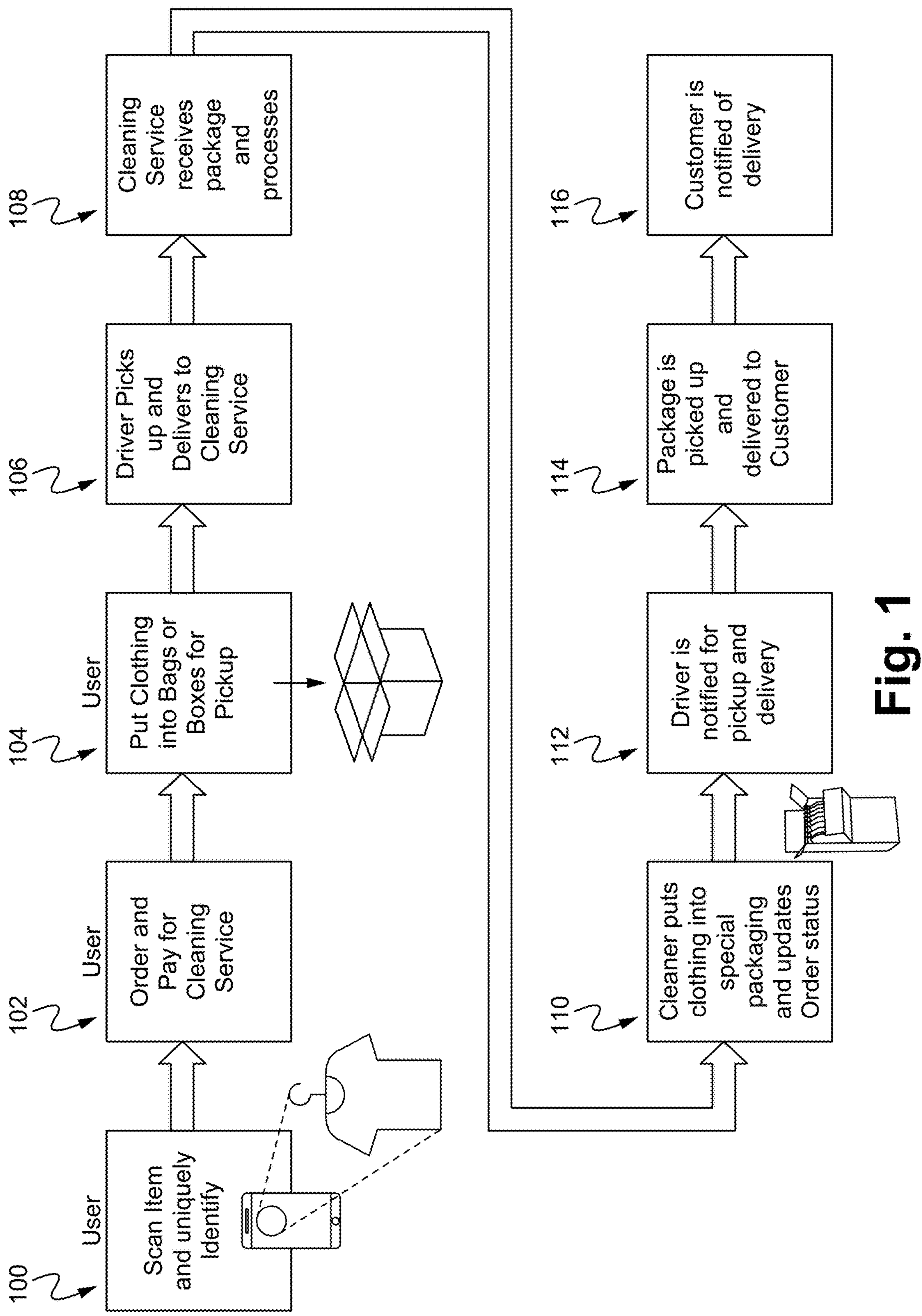
FIG. 1 illustrates a flowchart of a method of implementing a laundry/dry cleaning program according to some embodiments.

FIG. 1 illustrates a flowchart of a method of implementing a laundry/dry cleaning program according to some embodiments. In the step 100, an item is scanned and uniquely identified. A mobile device or other computing device with a camera is used to scan and/or take a picture of an item (e.g., shirt). Image analysis is used to analyze the aspects of the scan/image. For example, the style, the fabric/material, size and/or other aspects of an item are able to be determined. Furthering the example, a shirt is analyzed to determine that the shirt is made of polyester, has a logo on the bottom right corner and is Style X. The analysis is able to be performed in any manner such as by performing an image search to find a match of the search. The search is able to be expedited or narrowed, by image analysis of the material of the shirt which distinguishes materials such as leather, cotton, wool, polyester, silk and others based on image analysis of the fiber size, texture and/or other features. For example, instead of searching all shirts, since the shirt is identified as a silk shirt, only shirts classified as silk are searched. Similarly, a logo is able to be compared with stored logos, and when a match is determined, the search is able to be images of shirts within that company or only shirts with that logo. The tag/label of the item is also able to be detected and analyzed. For example, the tag may specify the company/brand, the size, the material, washing instructions and/or other aspects of the shirt. This information is also able to be used to determine the specific shirt. The search/classification/detection is able to be implemented in any manner. Ultimately, via image processing, searching and/or other analysis, the item is uniquely identified. In some embodiments, the scanning process occurs while the user points the camera at the shirt (and moves the camera around the shirt to scan different aspects of the shirt), and indicates when the shirt has been identified. The process is repeated for additional items (e.g., if a user has 5 dress shirts to be scanned, he will scan each one, and each one will be identified).

In the step 102, a user orders and pays for a cleaning service. An application ("app") on the user's mobile device or other computing device is able to be used to place an order for the scanned items to be cleaned and send payment. The payment is able to be any payment such as a mobile/digital payment, cryptocurrency, credit card payment and/or any other payment.

The order is able to be input manually, semi-automatically, or automatically filled based on the scanned items. Manual input involves a user specifying which cleaning service to use. For example, different cleaning options and corresponding prices are presented for the user to select one or more options. A semi-automatic implementation includes an automatic determination of potential cleaning service options where the user then selects from the options. An automatic option includes the app automatically determining which is the best cleaning service option based on the scanned items (e.g., using Artificial Intelligence (AI)/Machine Learning (ML)). For example, a user scans a dress shirt, sleeping bag, quilt, and suit. After identifying each item, it is also determined that the dress shirt and suit need to be dry cleaned, but the sleeping bag and quilt are cleaned in a different manner. Based on these cleaning requirements, a specific cleaning service or multiple cleaning services are selected. Factors are able to be used in selecting a "best" cleaning service such as price, quality/ratings, and/or any other factors. The factors are able to be selected/prioritized by the user upon initializing the app or at any time. For example, a user may prefer to focus on price/cost, so even if a slightly lower rated cleaning service is used, the price/cost is the most important or only factor considered when determining the service to use. In another example, a user has expensive clothing and only wants the best cleaning, so cost is not a factor and quality/ratings are the main or only factor considered. Transportation costs are able to be factored in as well.

An inventory of the scanned items and the selected cleaning preferences/procedures is maintained for ML purposes for future service requests.

In the step 104, the user puts the items into bags, boxes or another container/storage for pickup. The user is able to leave the items in the container outside the user's house/work. Another option is for the user to wait for the transport person/device to arrive before putting the container outside or the transport person/device taking the container from inside.

In the step 106, the transporter picks up and delivers the container to the cleaning service. In some embodiments, an automated version is implemented such as an unmanned aerial vehicle configured for picking up the container, or an autonomous vehicle arriving, and the user placing the container in or on the autonomous vehicle.

In the step 108, the cleaning service receives the container/package and processes (e.g., cleans) the items. For example, the cleaning service dry cleans the dry clean items, washes the washable items, and performs any other services that the user paid for.

In some embodiments, the cleaning service provider has a provider app which is configured for assisting in providing a service such as scanning the clothes for stains, rips, tears or other defects. The service provider app is also able to be used to inventory the clothing including identifying the item and storing relevant information such as cleaning recommendations/requirements. In some embodiments, the service provider app receives information from a user app, so the service provider app does not repeat the same process that the user app performed. For example, the service provider app receives images of an item, identification information of the item, and corresponding information of the item, from the user app. In some embodiments, the service provider app scans the clothes to perform a comparison with the received scans from the user app. The service provider app is also able to be used for service provider-specific features such as calculating/storing costs for cleaning an item, calculating/storing transporter information, managing/inventorying service requests, and/or other aspects of providing a service. In some embodiments, the service provider app is able to change the service based on the scan (e.g., detection of a rip in an item). For example, if a cleaner was only preparing to clean the item, upon detection of the rip, the cost of the service is increased to account for repairing the rip. In another example, the service provider sends the item to another service provider to repair the rip.

In the step 110, the cleaner puts the cleaned clothing into a container/packaging and updates the order status (e.g., completed). In some embodiments, the clothing is put into special packaging (e.g., one that includes a bar that enables the clothing to be hung). In some embodiments, the container/packaging includes a barcode, QR code or other identifying information for the transporter to scan.

In the step 112, a transporter is notified for pickup and delivery from the cleaning service to the user/customer. In some embodiments, for the automated implementation, an unmanned aerial vehicle or autonomous vehicle service is contacted. The notification/communication is able to be implemented in any manner (e.g., text message).

In the step 114, the container is picked up by the transporter and delivered to the customer. In some embodiments, for the automated implementation, the unmanned aerial vehicle is configured for picking up the container, or the autonomous vehicle arrives, and a cleaning service employee places the container in or on the autonomous vehicle. In some embodiments, the transporter scans identifying information on the container to determine where to deliver the container or other information. The scan may be automated (e.g., autonomous vehicle includes scanner to scan package). The transporter to deliver the package to the customer is able to be the same or a different transporter as the one who picked up the package from the customer.

In the step 116, the user (e.g., customer) is notified of the delivery (e.g., receives an email or text message on a mobile device).

In some embodiments, fewer or additional steps are implemented. In some embodiments, the order of the steps is modified. Depending on the implementation, the customer pays an amount where a percentage of the paid amount goes to the service provider and a percentage of the paid amount goes to the transporter.

Although clothing and cleaning services are described herein, the service portal and other aspects are able to be applied to any type of item or service (e.g., food/wine delivery, furniture cleaning/maintenance, interior design, sporting goods purchase/maintenance, vehicle purchase/maintenance, tree trimming, landscaping, painting, decorating).

For example, a user scans an item or area (e.g., set of trees to be trimmed, furniture to be cleaned, a broken chair to be repaired); the user orders and pays for a service (e.g., tree trimming, furniture cleaning, furniture repair); the service provider receives the order and performs the service (either by coming to the user's location for tree trimming or furniture cleaning or by receiving furniture to be repaired via a transporter); and the service transaction is completed (e.g., once the tree trimming is completed or the repaired furniture is returned to the user via the transporter). Additional steps are able to occur depending on the implementation such as rating the service, receiving notifications of completion of the service, and/or any other relevant steps.

In another example, a user is able to use a camera/phone to take/send a picture of a room. AI is able to determine size of room based on analysis of objects in the room. For example, a standard outlet size is 2"×3", so based on an outlet detected and other calculations, the AI is able to calculate the size of the room, and then based on additional AI, the price to paint the room is able to be calculated and/or painters are able to be recommended/selected.

Figure 2:
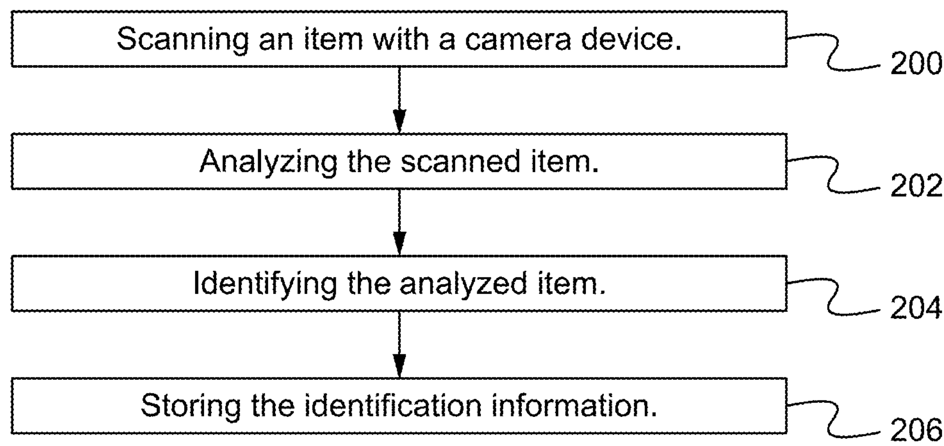
FIG. 2 illustrates a flowchart of a method of item identification via scanning according to some embodiments.

FIG. 2 illustrates a flowchart of a method of item identification via scanning according to some embodiments. In the step 200, a user scans an item with a camera device (e.g., on a mobile phone). For example, the user opens the user app which includes a "scan" button which causes the camera of the device to operate. While the camera is operating, the mobile device is configured to analyze the information viewed/acquired by the camera. In some embodiments, the scanning only occurs after the user takes a picture of the item to ensure the correct items are scanned. In some embodiments, multiple aspects of an item are captured for analysis. For example, a picture/scan of an entire item is acquired, a picture/scan of a closeup of part of the item is acquired, and a picture/scan of a tag of the item is acquired. Other aspects are able to be acquired such as the item from multiple sides (e.g., front, back, top, bottom, left, right, inside out).

In the step 202, the scanned item is analyzed. The scanned item is able to be analyzed in any manner such as using image/video processing, image matching, image searching, and/or others.

One exemplary analysis includes performing image searching to determine a match of the item with a known/labeled item. The search is able to be of a proprietary group of images or a broader search such as of the Internet. The search is able to use AI/ML to perform the search more intelligently and efficiently and to learn from each search. For example, based on ML, an item is able to be classified in narrower and narrower classifications depending on the item and the implementation. Furthering the example, if the item is a leather jacket, the item is first able to be classified as clothing, then in a jacket classification, and then in a leather jacket classification. The steps of classifications are able to be implemented based on ML. For example, based on previous learning and classification, an item that has two arms, a torso area, and has the shine of leather, and possibly other factors, the system is able to classify the item as a leather jacket. By initially classifying the item in the leather jacket classification, an image search does not waste time searching t-shirts, sleepwear, pants, hats, sleeping bags and other non-clothing items, and so on.

Determining the material/fabric of the item is able to be based on a spectrum or an amount of reflected light detected in the scan/image. For example, materials such as cotton or wool do not reflect much light, so they will have a different amount of reflected light than an item with sequins or made of shiny leather. Determining the material/fabric is also able to be by analyzing the fibers or other aspects of the material (e.g., texture) in the scan/image. For example, by increasing the zoom on a scan/image, the fibers of cotton look different from fibers of wool which look different from plastic sequins and leather material. Again, with ML, a system is able to classify the material (or materials) of the item. In addition to or instead of analyzing the material, a tag which lists the materials may be analyzed (e.g., using Optical Character Recognition (OCR)) to determine the materials of the item.

OCR or other character/image analysis is also able to be used to detect a logo or other distinguishing features of the item. For example, if a shirt has a swoosh, then it is known to be a Nike® shirt. Similarly, other writing or imagery on an item are significant distinguishing features to assist in searching for and classification of the item.

Masking, in conjunction with stain/damage detection, is able to be used to prevent misidentification of an item. For example, if a shirt has a big stain in the middle of the shirt, this could look like a logo or design on the shirt which could confuse the search and possibly result in a misidentification of the item. However, with ML to determine how stains, rips or other issues present, the shirt is able to be classified appropriately by masking out the damaged area. For example, the border of a stain is able to be analyzed closely, and if the color matching is sufficiently irregular (e.g., above a threshold), then it is determined to be a stain instead of a design/logo.

The search continues using the various features of the item until the item is identified (e.g., a match above a threshold is found). For example, if a tag of the item is scanned, and based on the tag matching searched/stored data, there is a 100% match with a known item, then the search stops. In another example, based on the texture of a shirt, a logo match and a color match with stored data of a shirt that is 99.95% match, with the threshold being 99.90%, then the shirt is identified based on the match with the stored shirt.

Items are able to be identified based on texture, flaws, stains, rips and/or other features as described herein.

In the step 204, the analyzed item is identified. Based on the item matching stored information, the item is able to be identified. In some embodiments, the analyzed item is merely provided the name (e.g., brand, style) of the item. In some embodiments, a unique identification is provided for the item. The unique identification is able to implemented in any manner such as an alphanumeric combination such as the user's name in combination with the brand, style and/or any other distinguishing information such that each item has an entirely unique identifier. For example, if a user has two pairs of the same pants, the identifiers may be Bob's X Brand Jeans 1 and Bob's X Brand Jeans 2.

In the step 206, the identification information of the item is stored. In addition to the identification information, the data used to identify the item is stored. For example, any scans/images are stored, and the search process is able to be stored. Additionally, description information of the item is stored. In some embodiments, the information is stored via ML such that when the user scans the items the next time, the first items to be searched are previously acquired items. For example, a user scans his Armani suit to be cleaned. Then 8 months later, he scans it again, and the system via the ML is able to easily detect that it is the same suit that was previously scanned and pulls up the same identification information. Other related information is able to be stored and retrieved.

In some embodiments, fewer or additional steps are implemented. In some embodiments, the order of the steps is modified.

Figure 3:
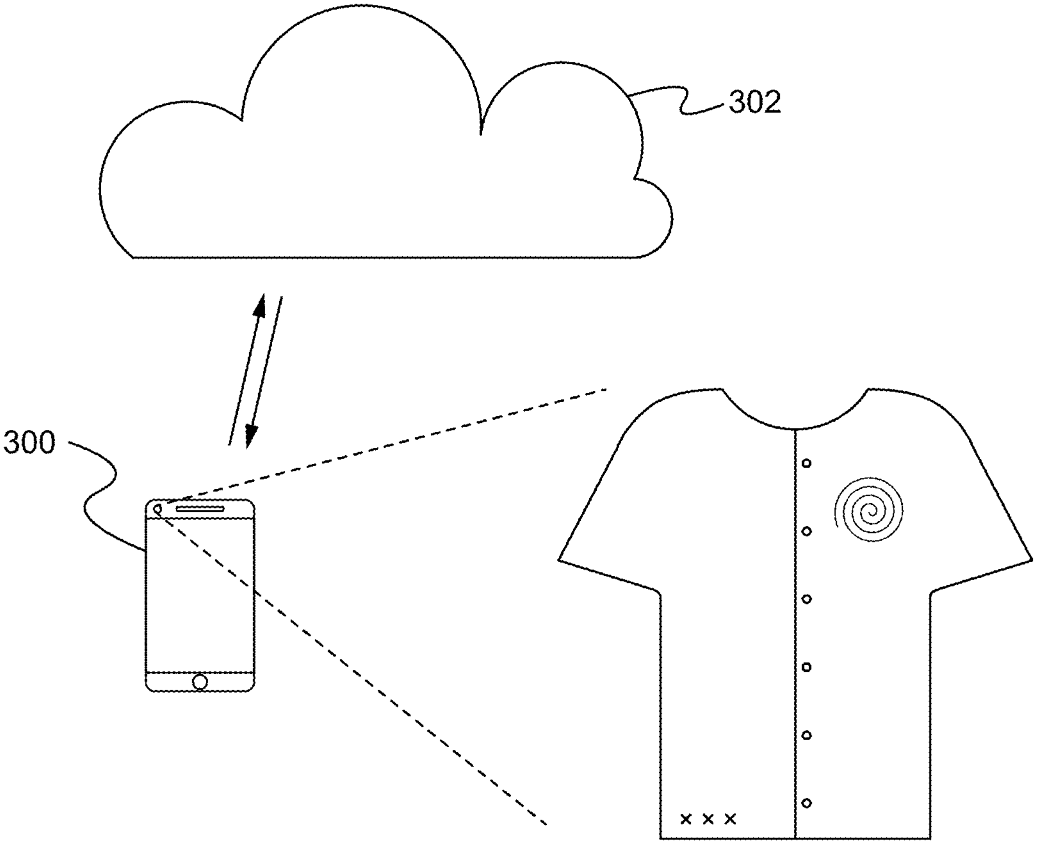
FIG. 3 illustrates a diagram of using a mobile device to scan and identify an item according to some embodiments.

FIG. 3 illustrates a diagram of using a mobile device to scan and identify an item according to some embodiments. A mobile device 300 (e.g., smart phone, tablet) includes a camera which is able to be used to scan an item (e.g., a shirt). In some embodiments, the mobile device 300 is configured to perform the analysis of the item to identify the item. In some embodiments, the mobile device 300 communicates the scans or other information to a network device 302 (e.g., the Cloud). The network device 302 then performs the analysis to identify the item. The network device 302 communicates the analysis/identification information to the mobile device 300.

Figure 4:
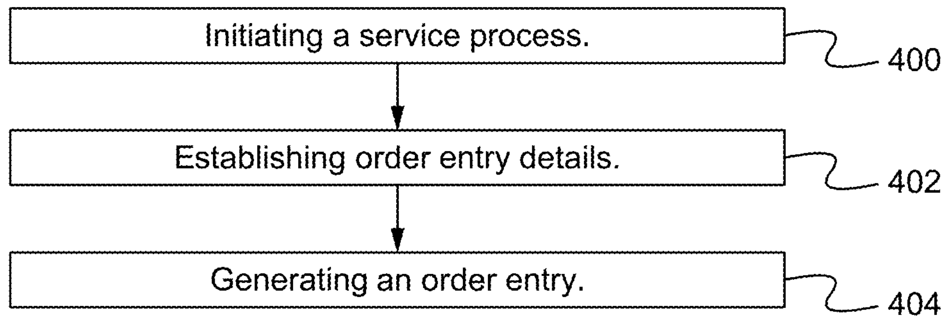
FIG. 4 illustrates a flowchart of a method of item order entry via scanned identification according to some embodiments.

FIG. 4 illustrates a flowchart of a method of item order entry via scanned identification according to some embodiments. In the step 400, after an item or items are scanned and identified, a service process is initiated. The service process includes generating an item order entry for each of the items to be processed (e.g., cleaned). For example, if a shirt is scanned, then an order entry for a shirt is opened. The order entry initially includes fields that are blank which will be filled as the process continues (e.g., the fields are filled in based on user selections and/or ML). As described herein, the item order entry is able to be generated manually, semi-automatically or automatically, depending on the implementation. For example, in some embodiments, the fields are filled in automatically using AI/ML.

In the step 402, the order entry details are established. An order entry may include specific details such as which service provider to use, service details (e.g., type of cleaning), which transporter to use, the price per item, the total price, pickup date/time, dropoff date/time, and/or any other information to process the order.

In some embodiments, a service provider and/or transporter are selected and/or communicated with based on the items to be processed to establish the order entry details. In some embodiments the order entry only includes selecting/communicating with the service provider. For example, the user or user device selects a service provider, and then the service provider without user input selects a transporter.

The service provider is able to be selected based on multiple factors such as availability, the items to be processed (e.g., cleaned), the location of the pickup (e.g., user's house), the service provider's rating, the service provider's fees, the type of service to be provided (e.g., cleaning, repair), and/or any other factors/criteria.

The transporter is able to be selected based on multiple factors such as availability, the items to be transported, the location of the pickup (e.g., user's house) and dropoff (e.g., service provider's business), the transporter's rating, the transporter's fees, and/or any other factors/criteria.

In some embodiments, multiple transporters and/or service providers are utilized. For example, a user may have one suit to be cleaned that happens to have a tear which needs to be repaired and a second suit that just needs to be cleaned. The cheapest cleaning service only does cleaning and does not do repairs, so the first suit goes to a different cleaning service which also does repairs, while the second suit is sent to the cleaning service which only does cleaning. If it is determined that sending both suits to the cleaning service is a preferred choice, that option may be presented to the user or selected automatically, depending on the implementation.

In some embodiments, ML is able to be used to accurately and efficiently select or suggest the transporter and the service provider. The ML is able to be based on previous orders by the user and/or orders by other users in the area and beyond. The ML is able to utilize the variety of factors in selecting the transporter and the service provider.

In some embodiments, the ML is trained by the user and/or other users such that the ML is able to make automatic selections after the training (and before an order is generated). For example, a user inputs into an app that the user prefers the cheapest service provider as long as the service provider has at least 4 out of 5 stars in quality ratings. The user also inputs that for shirts being cleaned, the service must be provided within 1 week, suits within 2 weeks, but there is no time constraint for the user's tuxedo. The user is able to input maximum prices for specific items (e.g., no more than $2 per shirt). Any other factors/criteria are able to be input, as desired. The ML is then able to use this initial information to search for a service provider when service is requested (e.g., after an item is scanned).

In some embodiments, after a service is provided, the user is requested to provide a rating of the service. The rating of the specific service is able to be learned as well and used for future services. For example, if a user was very happy with Laundry X's service, and the user gave the service a 5 star rating, then the next time the user requests laundry service, Laundry X will be used unless there is some other issue (e.g., they are backlogged and cannot complete the laundry cleaning in time). With ML, other laundry service ratings will be analyzed, and although the user was happy with the first experience, if other people had bad experiences, and the rating for Laundry X drops, while the rating for Laundry Y increase or stays at 5 stars, then the system may select or recommend Laundry Y for the next cleaning.

Markets are continuously changing with some businesses closing, opening, changing ownership/management, and changing employees, so it is important for machine learning to continuously learn which service providers are best, and more specifically, which service providers are best for each individual user. Some users are very cost conscious, some do not care about cost and only worry about quality, others are very focused on environmental/"green" cleaning, and there are many other user criteria.

Service provider criteria are analyzed. For example, a service provider cleans clothes, performs dry cleaning, repairs clothes, cleans other objects (e.g., sleeping bags), and/or another criteria, and/or any combination thereof. Other criteria include the current wait time for a cleaning, the cost per item or total cost, cleaning materials used (e.g., green cleaning), and/or the service provider's rating and/or location.

Similarly, the transporters have ratings and various criteria which will cause them to be selected or suggested for use. In addition to analyzing user preferences, transporter criteria are also analyzed. For example, a transporter may only be able to transport on certain days, the transporter's currently scheduled pickup/deliveries are able to be tracked to avoid conflicts or to piggy back on other pickup/deliveries based on proximity/route, the transporter's vehicle may only accommodate X number of items or items no bigger than Z size, the transporter's rating, range/radius and cost/fee is able to be specified/known, and/or any other criteria related to the transporter are able to be known, analyzed and learned.

The specific details of the order are able to be manually, semi-automatically or automatically established (e.g., input in a request/order form). For example, via ML, the system is able to autofill an order form to clean two jackets and three shirts, for a total of $16, where the clothing will be picked up on Tuesday and returned to the user on Friday. In some embodiments, fewer or additional details are provided. For example, in a minimalist implementation, the user is provided very few details such as only the information needed to complete the transaction (e.g., the user does not even know the cleaning service name). In another implementation, all of the details are available to the user such as the cost, pickup/dropoff dates, cleaning service name, cleaning service procedure, transporter name, an itemized breakdown of the costs, and/or any other details.

In the step 404, after the transporter and/or service provider details are analyzed, an order entry is generated/completed. For example, the order entry includes the specific details of the order and payment for the order.

In some embodiments, fewer or additional steps are implemented. In some embodiments, the order of the steps is modified.

Figure 5:
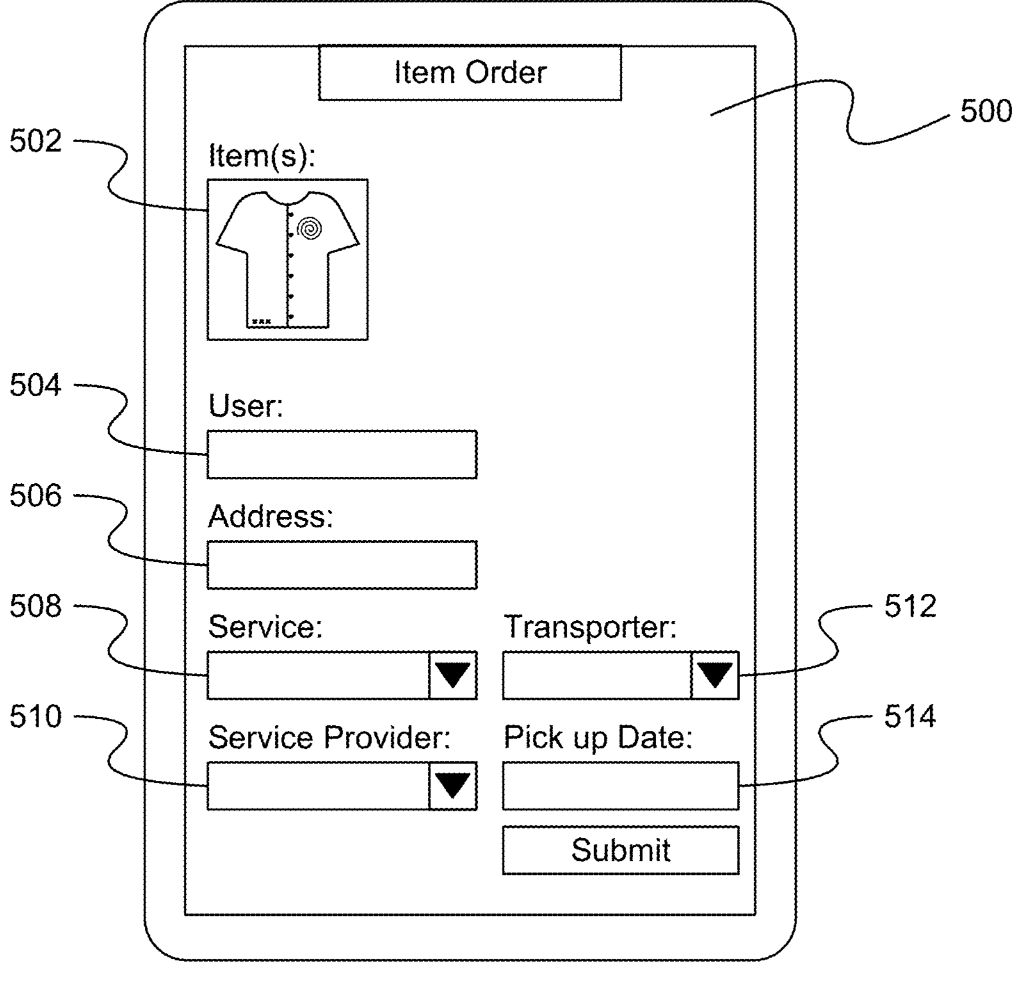
FIG. 5 illustrates a diagram of a display of an exemplary interface of the item order entry according to some embodiments.

FIG. 5 illustrates a diagram of a display of an exemplary interface of the item order entry according to some embodiments. A Graphical User Interface (GUI) 500 is displayed on a screen of a mobile device. The GUI 500 shows the scanned item(s) 502 and includes entry boxes, drop down lists or other input mechanisms for the user's name 504, address 506, service 508 (e.g., cleaning, repair), service provider 510, transporter 512, and pickup date 514. As described herein, fewer or additional input mechanisms are able to be provided. The input mechanisms are able to be auto-filled using AI/ML or manually by a user. The GUI 500 is able to include additional pages such as a page with detailed cost/price information, additional service provider information, additional transporter information, and/or any other information.

Figure 6:
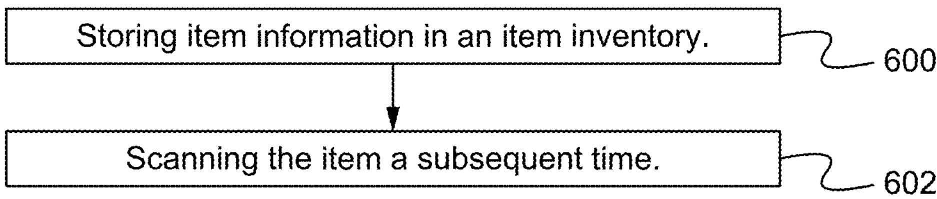
FIG. 6 illustrates a flowchart of a method of item inventory and asset management via unique scanned identities according to some embodiments.

FIG. 6 illustrates a flowchart of a method of item inventory and asset management via unique scanned identities according to some embodiments. In the step 600, after an item is scanned and uniquely identified, the item information is stored in an item inventory. The item information is able to include a unique identity/label for the item, images/scans of the item, keywords related to the item, cleaning instructions for the item, previous cleaning services/providers used and/or other information. A user is able to scan and store many items, e.g., to generate an inventory of items.

The item information is able to be stored using various classifications and other ML techniques to easily recall stored information and learn from previous instances to use for future instances. For example, for cleaning, items are able to be grouped or classified in any variety of ways such as based on type (of clothing) including jackets, shirts, pants, suits, underwear, hats, shoes, non-clothing items, and/or others. Each classification or category is able to have sub-classifications such as based on the material, size, brand, style, logo, cleaning procedure (e.g., hot wash, warm wash, cold wash, dry clean), and/or others. For example, in some embodiments, jackets are classified as leather, wool, cotton, nylon, hemp, flannel, cashmere and/or others. In another example, in some embodiments, jackets are classified by those that need to be washed in hot water, in warm water, in cold water, dry cleaned and/or others. The items are able to be classified in any manner such as based on item analysis/determination, material analysis/determination, cleaning procedure analysis/determination, and/or other analysis, determination and classification. The classifications are able to be linked and/or cross-referenced. The classifications/sub-classifications are able to be in any order/arrangement.

In an example, when a user scans his leather jacket to be cleaned, the leather jacket is provided a unique identifier, and any relevant item information such as scans/images of the item along with the unique identifier is stored in the clothing→jackets→leather category.

In the step 602, after the item is scanned a subsequent time, the identification of the item is easier and more efficient since the item information is already stored. The stored item information is able to be retrieved, including the unique identifier. Additionally, the previous transporter information and cleaning information are retrieved so the same transportation procedure and cleaning procedure are implemented and possibly with the same service providers. By retrieving stored cleaning information, significantly less computing power is used, since all of the analysis of how to clean the item, where to clean the item, how to transport the item, and so on is already available.

The identification of the item is able to be implemented manually or automatically. For example, previously identified items are able to be presented to a user for manual selection of the current item. In another example, a system searches the previously identified items for the user first before searching other items to automatically identify the current item.

In some embodiments, fewer or additional steps are implemented. In some embodiments, the order of the steps is modified.

Figure 7:
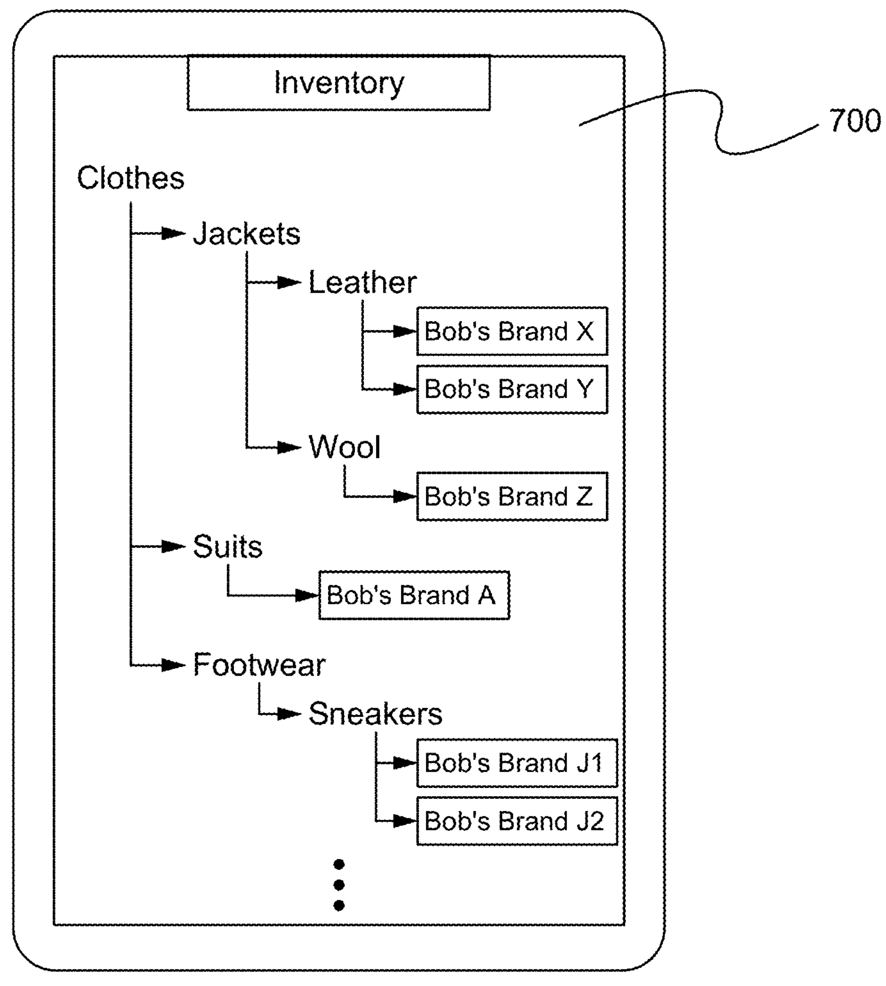
FIG. 7 illustrates an exemplary interface of item inventory according to some embodiments.

FIG. 7 illustrates an exemplary interface of an item inventory according to some embodiments. The inventory 700 is able to be displayed in any manner such as a tree format, an image list format, or a text list format. In some embodiments, the inventory includes classes and subclasses as shown. The items such as Bob's Brand X jacket are able to be selectable to provide details related to the item. For example, the scans of the item, the purchase price of the item, current market price of the item, previous cleaning information, material information and/or other relevant information are displayed by a user selecting a specific item. The inventory 700 is able to be navigated in any manner such as scrolling up and down, left and right. The classifications are able to be expanded and collapsed, and any other features are able to be implemented to improve the display, navigation and usability of the inventory.

Figure 8:
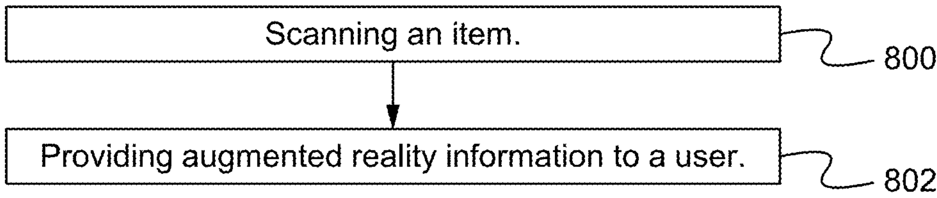
FIG. 8 illustrates a flowchart of implementing augmented reality of scanned items according to some embodiments.

FIG. 8 illustrates a flowchart of implementing augmented reality of scanned items according to some embodiments. By scanning, storing and managing the item information, additional features are able to be implemented using a mobile device such as augmented reality. As described above, an item is scanned and identified. Scanning the item is able to include acquiring information, and after the item is identified, additional information related to the item is able to be found and stored.

In the step 800, an item is scanned. The item is scanned and identified as described herein. In the step 802, augmented reality information is provided to the user. The augmented reality information is able to be provided on the screen of the mobile device while the item is being scanned. The augmented reality information is able to include details about the item, historical information about the item, service information of the item, characteristics of the item, components of the item, materials of the item, and any other information related to the item. The augmented reality information is also able to provide an interface for the user to request a service for the item or order a replacement product or similar product (e.g., via Amazon or another service). For example, a user is able to select a cleaning service via the augmented reality information displayed (e.g., cleaning service companies are displayed in a list or on a map). The transportation and cleaning of the item is able to be implemented as described herein. Based on ML, the system is able to track updates and/or changes to items, such that if a current model is no longer being produced but version 2.0 of the item is now available, then the new version is able to be recommended/displayed.

The augmented reality information is able to provide maintenance and cleaning instructions. For example, a reminder to change an air conditioning filter appears every three months, or for a vehicle, an oil change is recommended every six months.

In some embodiments, the augmented reality information is able to provide suggestions (e.g., to purchase) based on related items. For example, if a person purchases a specific dress, the augmented reality information is able to include shoes or a purse that goes well with the dress. The augmented reality is able to show the shoes on the user while she is wearing the dress. The suggested complementary items are able to be based on ML (e.g., by analyzing other images of the dress and the shoes being worn with the dress, then those shoes are able to be suggested as complementary). Further analysis is able to occur such as analyzing the number of positive/negative comments/selections for the image. For example, if an image of a dress with shoes has many negative comments, then those shoes are not recommended as a complementary item, but different shoes in an image with the dress that received many hearts or thumbs up and very few thumbs down, are recommended. In some embodiments, the ML analyzes what "influencers" on social media sites (e.g., YouTube®, TikTok®, Instagram®) suggest or recommend to then provide recommendations to users. In some embodiments, instead of or in addition to providing the information as augmented reality information, the information is provided in another format such as virtual reality or a different format (e.g., via text, email, web page, social media content, image, video).

In some embodiments, the information displayed as augmented reality is able to be shared (e.g., via social media) with other users. For example, a user is able to share her information about some or all of her shoes with her followers or a specific friend. The information is also able to be used to generate virtual reality content. For example, a scanned real-world shoe is able to be converted into a virtual shoe for use in a virtual universe.

In some embodiments, fewer or additional steps are implemented. In some embodiments, the order of the steps is modified.

Figure 9:
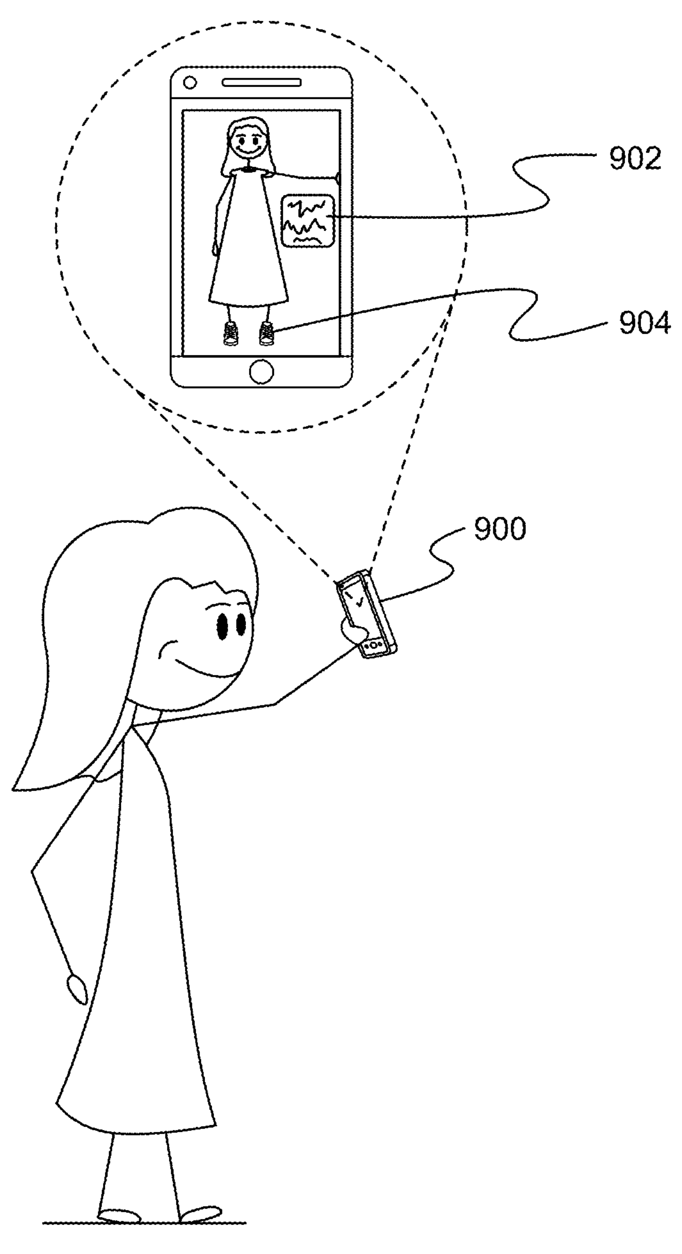
FIG. 9 illustrates a diagram of an exemplary augmented reality implementation according to some embodiments.

FIG. 9 illustrates a diagram of an exemplary augmented reality implementation according to some embodiments. In the example, a user is wearing a dress with bare feet. The user holds a mobile device 900 with a camera pointed at the user. The camera scans the user's dress and provides augmented reality information 902 on the screen of the mobile device. The augmented reality information is able to include the price of the dress, cleaning instructions for the dress, and other relevant information for the dress. Augmented reality complementary shoes 904 are displayed on the user's feet. The augmented reality shoes 904 are able to be placed based on foot detection or other video/image analysis. The augmented reality shoes 904 are able to be selected based on analysis (or previous analysis) of the dress to find complementary shoes. For example, a database includes the dress and corresponding, complementary shoes for the dress based on analyzing images and videos on the Internet which include the dress and a variety of shoes. In some embodiments, the user is able to navigate to other shoes (e.g., by swiping left/right on the screen (or via eye tracking and the user looking left/right) to go to a previous/next complementary shoe. Other complementary items are able to be displayed such as a purse, makeup, jewelry, and more. Augmented reality information for the complementary items is able to be displayed such as price, where to buy an item and cleaning instructions. Although a dress and shoes are shown as an example, any items are able to be scanned and have augmented reality information provided.

Figure 10:
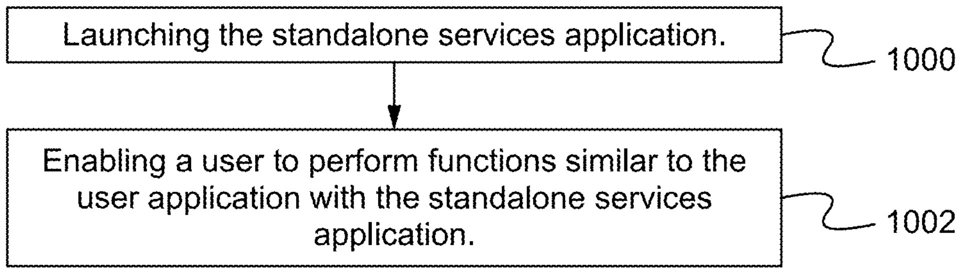
FIG. 10 illustrates a flowchart of utilizing a standalone services app according to some embodiments.

FIG. 10 illustrates a flowchart of utilizing a standalone services app according to some embodiments. The standalone services app is able to be part of (e.g., as an extension) or separate from the user app described herein. As described herein, the user app enables a user to request a service (along with accompanying features such as paying for the service). The standalone services app enables a user to use similar features as the user app, but for different purposes. For example, a laundry/wardrobe app is able to be used by a user to identify wardrobe items, keep a personal inventory of the items, calculate values of the items, sort and display the items in various formats, and other interactive features related to a user's clothing items. The standalone services app is able to be used as a home inventory system (e.g., for a collector inventory or for insurance purposes).

In the step 1000, the standalone services app is installed and/or launched. The standalone services app is able to be installed via download or any other manner. In some embodiments, the standalone services app is accessible via a link or other mechanism in the user app. In some embodiments, the standalone services app is already resident on a user device (e.g., mobile phone), and the user launches the app by tapping an icon or any other manner of starting the app.

In the step 1002, the standalone services app enables a user to perform functions similar to or related to the user app, but without requesting a service from a service provider (e.g., laundry cleaning service). For example, the standalone services app enables a user to scan all of her clothing to have a digital inventory of the clothing. The standalone services app is able to automatically identify the clothing, organize/sort the clothing, calculate current/market values of the clothing, and/or sort/display the clothing in various formats. In addition to or instead of clothing, any other items are able to be inventoried such as coins, baseball cards, paintings, other collectibles, furniture, bicycles, vehicles, and/or sporting equipment. For example, in addition to a physical coin collection binder, a user is able to have a digital version of the binder, which is easier to scroll through and/or search. Additionally, by having a digital version of the coins, the original coins are able to be securely stored without fear of them being stolen or damaged, and then digital version of the coins are able to be displayed.

For example, a user is able to scan items in the rooms of her house to generate an inventory list for insurance purposes or other purposes. In another example, a user is able to scan several items, which are then identified, and then a current market price is determined using ML or other analysis for each item. The user is then able to sell or donate the items knowing an appropriate sales/donation price. In some embodiments, the standalone app includes a feature to automatically post the items for sale online (e.g., on Craigslist® or eBay®). In another example, the user is able to scan his home for conversion to virtual reality such that the user's home in a virtual realm mimics the user's real home.

In some embodiments, fewer or additional steps are implemented. In some embodiments, the order of the steps is modified.

Figure 11:
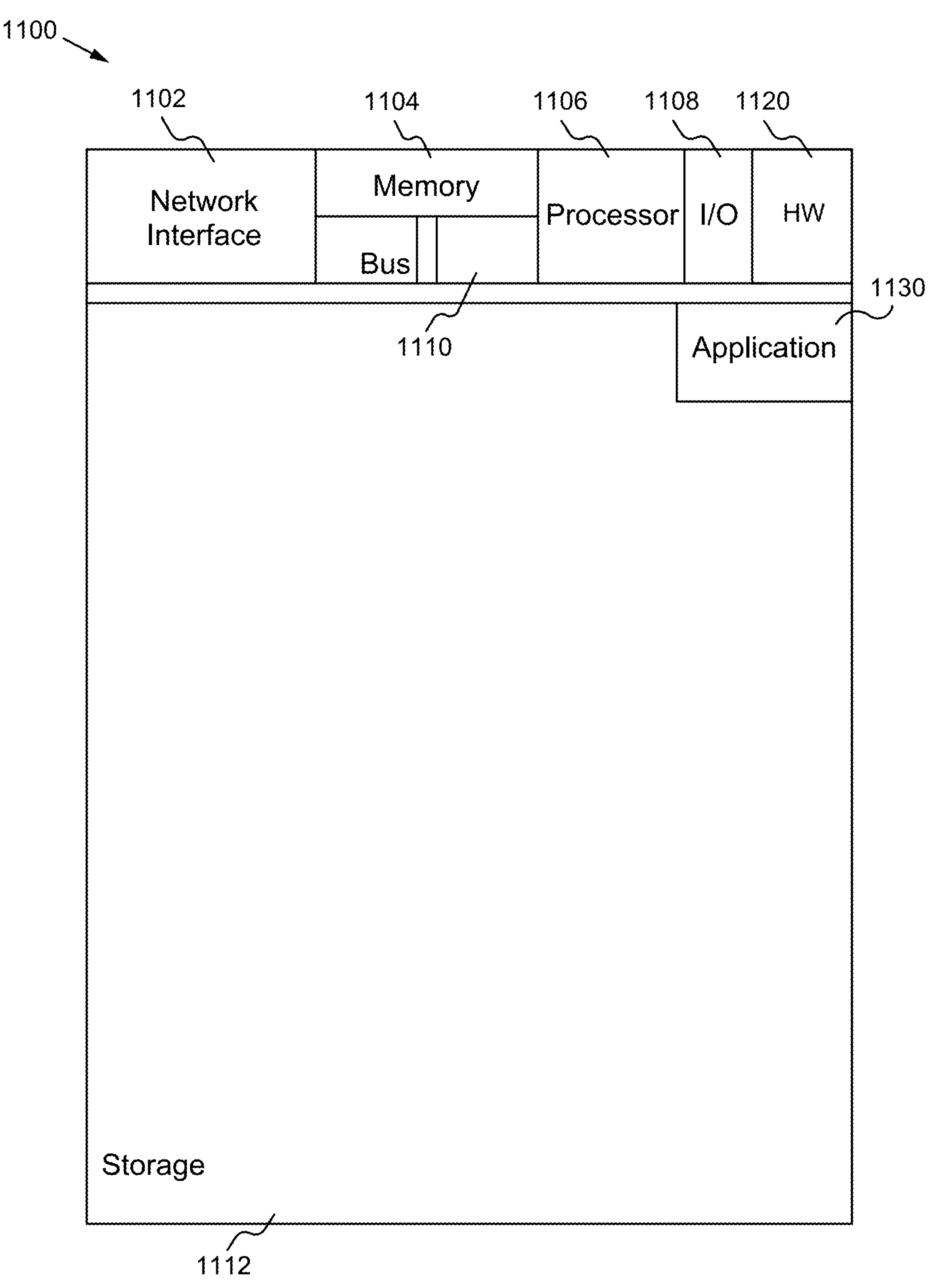
FIG. 11 illustrates a block diagram of an exemplary computing device configured to implement the service portal according to some embodiments.

FIG. 11 illustrates a block diagram of an exemplary computing device configured to implement the service portal according to some embodiments. The computing device 1100 is able to be used to acquire, store, compute, process, communicate and/or display information such as scans, images and videos. The computing device 1100 is able to implement any of the service portal aspects. In general, a hardware structure suitable for implementing the computing device 1100 includes a network interface 1102, a memory 1104, a processor 1106, I/O device(s) 1108, a bus 1110 and a storage device 1112. The choice of processor is not critical as long as a suitable processor with sufficient speed is chosen. The memory 1104 is able to be any conventional computer memory known in the art. The storage device 1112 is able to include a hard drive, CDROM, CDRW, DVD, DVDRW, High Definition disc/drive, ultra-HD drive, flash memory card or any other storage device. The computing device 1100 is able to include one or more network interfaces 1102. An example of a network interface includes a network card connected to an Ethernet or other type of LAN. The I/O device(s) 1108 are able to include one or more of the following: keyboard, mouse, monitor, screen, printer, modem, touchscreen, button interface and other devices. Service portal application(s) 1130 used to implement the service portal implementation are likely to be stored in the storage device 1112 and memory 1104 and processed as applications are typically processed. More or fewer components shown in FIG. 11 are able to be included in the computing device 1100. In some embodiments, service portal hardware 1120 is included. Although the computing device 1100 in FIG. 11 includes applications 1130 and hardware 1120 for the service portal method, the service portal method is able to be implemented on a computing device in hardware, firmware, software or any combination thereof. For example, in some embodiments, the service portal applications 1130 are programmed in a memory and executed using a processor. In another example, in some embodiments, the service portal hardware 1120 is programmed hardware logic including gates specifically designed to implement the service portal.

In some embodiments, the service portal application(s) 1130 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

The service portal and aspects of the service portal are able to be processed and performed locally (e.g., on a user's device), remotely (e.g., in the Cloud) or a combination thereof. For example, a user device acquires data and sends the data to a network device to process the data, including using ML to learn from the data.

Figure 12:
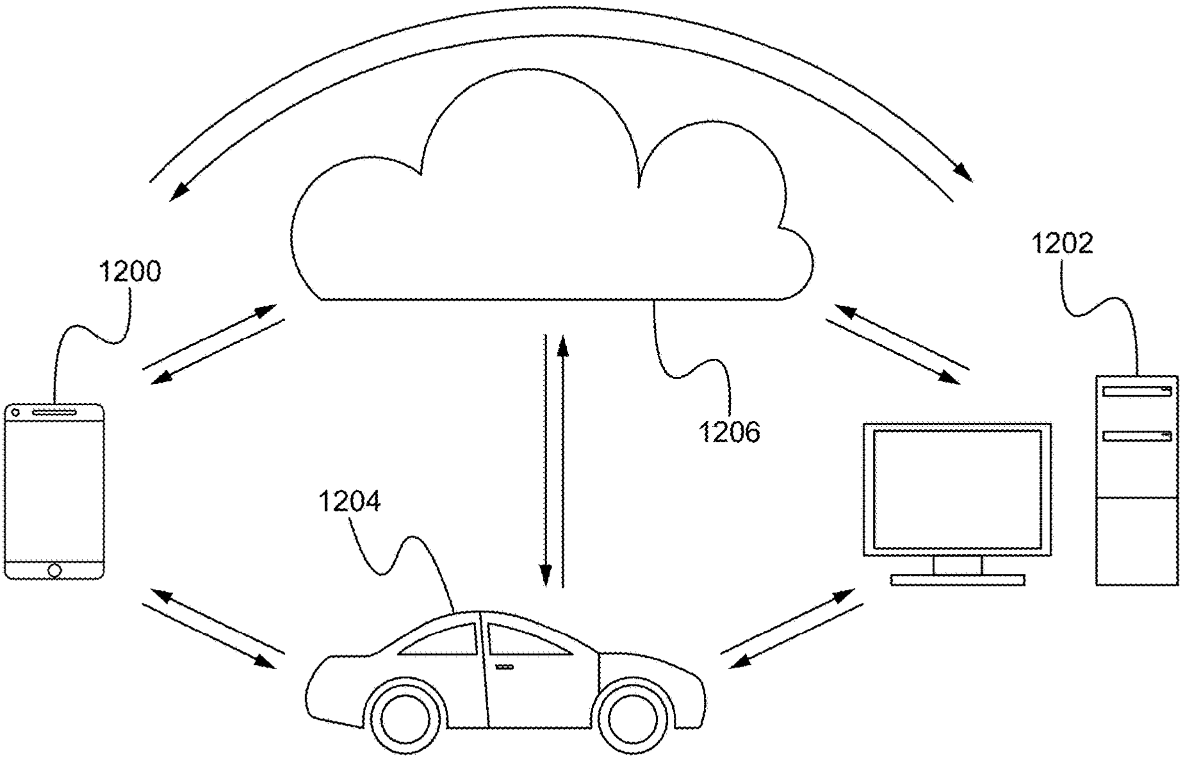
FIG. 12 illustrates a diagram of a network of devices configured for implementing the service portal according to some embodiments.

FIG. 12 illustrates a diagram of a network of devices configured for implementing the service portal according to some embodiments. A user device 1200 (e.g., mobile phone, laptop, personal computer) includes a user app. The user app enables a user to scan items, identify items, request/select a service and/or other aspects of the service portal described herein. A service device 1202 (e.g., mobile phone, laptop, personal computer) includes a service app. The service app enables a service provider to receive and process service requests and/or other aspects of the service portal described herein. A transporter device 1204 (e.g., mobile phone, laptop, personal computer, autonomous vehicle, unmanned aerial vehicle) includes a transporter app. The transporter app enables a transporter to receive and process transportation requests and/or other aspects of the service portal described herein. A network device 1206 (e.g., Cloud device) is able to send and receive data to/from the user device 1200, the service device 1202 and/or the transporter device 1204. In some embodiments, other devices are involved.

To utilize the service portal, a device scans an item and identifies the item. After the item is identified, a service is performed (e.g., a cleaning service to clean a shirt). Transportation of the item to and from the service location is able to be automated.

In operation, the service portal enables a service to be provided efficiently. In addition to identifying an item by scanning, information related to the item is able to be stored and used in later service requests. By utilizing a camera of a device, image processing and machine learning, an item is able to be identified extremely quickly. The system is able to search and analyze much more content than is humanly possible in a very short amount of time.

The service portal also enables automation of a process of requesting and receiving a service. After an item is scanned with a camera, an order is able to be automatically placed, the item is able to be transported to the service provider autonomously, the service provider is able to perform the service using autonomous equipment, and the item is able to be transported back to a user autonomously.

Additionally, machine learning is able to be used to optimize the service process such as selecting the best transporter, the best service provider, and other aspects of the service.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method programmed in a non-transitory memory of a device comprising:

applying a digital mask on a stain within one or more digital images of a scanned item such that the stain is masked out during analysis of the scanned item to prevent misidentification of the scanned item, wherein the stain is located on the scanned item, the stain is detected using machine learning based on a border of the stain within the digital images and the stain is not an effect of noise within the digital images; and storing identification information of the item, wherein the identification information of the item includes: a unique identifier of the item, an image of the item and a description of the item.

2. The method of claim 1 wherein scanning the item utilizes a camera of the device.

3. The method of claim 1 wherein scanning the item includes scanning the item from a plurality of angles.

4. The method of claim 1 wherein analyzing the scanned item includes performing image searching to determine a match of the scanned item with a stored item.

5. The method of claim 1 wherein analyzing the scanned item includes classifying the scanned item in one or more classifications and one or more sub-classifications.

6. The method of claim 1 wherein analyzing the scanned item includes determining a material of the scanned item.

7. The method of claim 6 wherein determining a material of the scanned item includes analyzing a spectrum or an amount of reflected light detected in a scan of the item.

8. The method of claim 6 wherein determining a material of the scanned item includes analyzing fibers of the material.

9. The method of claim 1 wherein analyzing the scanned item includes detecting stains, flaws, rips or texture.

10. The method of claim 1 wherein analyzing the scanned item includes utilizing optical character recognition to detect distinguishing features of the item.

11. The method of claim 1 wherein the identification information enables re-scanning of the item for automatic identification.

12. An apparatus comprising:

a camera for scanning an item of a user;

a non-transitory memory for storing an application, the application for:

applying a digital mask on a stain within one or more digital images of a scanned item such that the stain is masked out during analysis of the scanned item to prevent misidentification of the scanned item, wherein the stain is located on the scanned item, the stain is detected using machine learning based on a border of the stain within the digital images and the stain is not an effect of noise within the digital images; and storing identification information of the item, wherein the identification information of the item includes: a unique identifier of the item, an image of the item and a description of the item; and a processor for processing the application.

13. The apparatus of claim 12 wherein scanning the item includes scanning the item from a plurality of angles.

14. The apparatus of claim 12 wherein analyzing the scanned item includes performing image searching to determine a match of the scanned item with a stored item.

15. The apparatus of claim 12 wherein analyzing the scanned item includes classifying the scanned item in one or more classifications and one or more sub-classifications.

16. The apparatus of claim 12 wherein analyzing the scanned item includes determining a material of the scanned item.

17. The apparatus of claim 16 wherein determining a material of the scanned item includes analyzing a spectrum or an amount of reflected light detected in a scan of the item.

18. The apparatus of claim 16 wherein determining a material of the scanned item includes analyzing fibers of the material.

19. The apparatus of claim 12 wherein analyzing the scanned item includes detecting stains, flaws, rips or texture.

20. The apparatus of claim 12 wherein analyzing the scanned item includes utilizing optical character recognition to detect distinguishing features of the item.

21. The apparatus of claim 12 wherein the identification information enables re-scanning of the item for automatic identification.

22. An apparatus comprising:

a non-transitory memory for storing an application, the application for:

applying a digital mask on a stain within one or more digital images of a scanned item such that the stain is masked out during analysis of the scanned item to prevent misidentification of the scanned item, wherein the stain is located on the scanned item, the stain is detected using machine learning based on a border of the stain within the digital images and the stain is not an effect of noise within the digital images; and storing identification information of the item, wherein the identification information of the item includes: a unique identifier of the item, an image of the item and a description of the item; and a processor for processing the application.

23. The apparatus of claim 22 wherein the scanned item is scanned from a plurality of angles.

24. The apparatus of claim 22 wherein analyzing the scanned item includes performing image searching to determine a match of the scanned item with a stored item.

25. The apparatus of claim 22 wherein analyzing the scanned item includes classifying the scanned item in one or more classifications and one or more sub-classifications.

26. The apparatus of claim 22 wherein analyzing the scanned item includes determining a material of the scanned item.

27. The apparatus of claim 26 wherein determining a material of the scanned item includes analyzing a spectrum or an amount of reflected light detected in a scan of the item.

28. The apparatus of claim 26 wherein determining a material of the scanned item includes analyzing fibers of the material.

29. The apparatus of claim 22 wherein analyzing the scanned item includes detecting stains, flaws, rips or texture.

30. The apparatus of claim 22 wherein analyzing the scanned item includes utilizing optical character recognition to detect distinguishing features of the item.

31. The apparatus of claim 22 wherein the identification information enables re-scanning of the item for automatic identification.

* * * * *